United States Patent [19]

Antonucci

[11] Patent Number: 4,852,221

[45] Date of Patent: Aug. 1, 1989

[54] APPARATUS FOR RETAINING A WRITING INSTRUMENT ON A PAIR OF SPECTACLES OR SUNGLASSES

[76] Inventor: Mark Antonucci, 2520 A 5th St., Santa Monica, Calif. 90405

[21] Appl. No.: 258,593

[22] Filed: Oct. 17, 1988

[51] Int. Cl.$^4$ ............................................. A44B 21/00
[52] U.S. Cl. .................................. 24/10 R; 24/3 C; 24/306
[58] Field of Search .......... 24/10 R, 3 C, 3 E, 11 CC, 24/11 CT, 11 S, 11 HC

[56] References Cited

U.S. PATENT DOCUMENTS

| | | | |
|---|---|---|---|
| 2,644,212 | 7/1953 | Markowitz | 24/10 R |
| 2,704,961 | 3/1955 | Weil | 24/3 C |
| 2,832,114 | 4/1958 | Mead | 24/10 R |
| 2,964,812 | 12/1960 | Cook | 24/10 R |
| 3,128,514 | 4/1964 | Parker et al. | 24/3 E |
| 3,374,508 | 3/1968 | Slimovitz | 24/306 |
| 3,387,341 | 6/1968 | Mates et al. | 24/10 R |
| 3,769,663 | 11/1973 | Perl | 24/3 C |
| 4,349,246 | 9/1982 | Binner | 24/3 C |

*Primary Examiner*—Victor N. Sakran
*Attorney, Agent, or Firm*—Thomas I. Rozsa

[57] ABSTRACT

An apparatus to be attached to a pair of spectacles or sunglasses and which provides a means for carrying a writing instrument in a manner from which it can be readily removed for use and subsequently replaced on the apparatus for subsequent reuse. The apparatus includes the combination of a partially opened hollow clip and an attachment means by which the partially opened hollow clip can be either permanently or removably attached to a pair of spectacles or sunglasses.

20 Claims, 1 Drawing Sheet

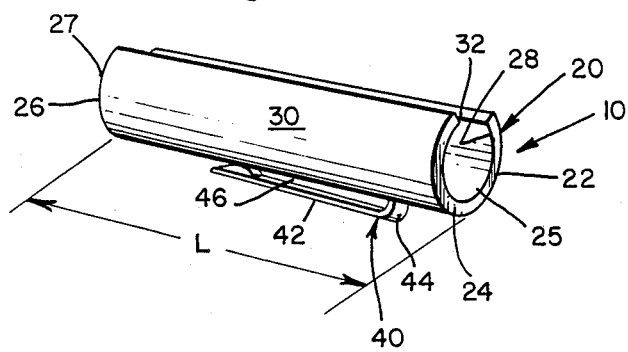
Fig. 1.
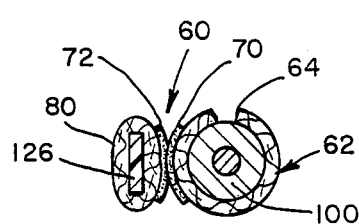
Fig. 2.
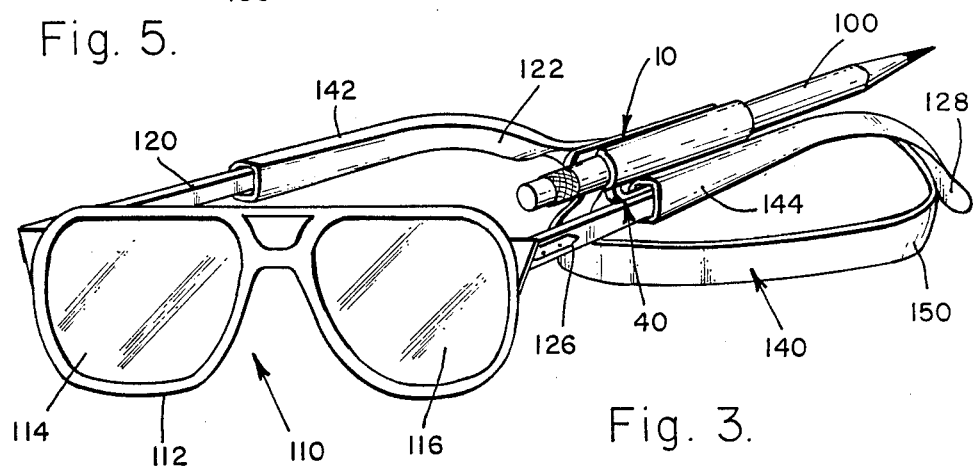
Fig. 5.
Fig. 3.
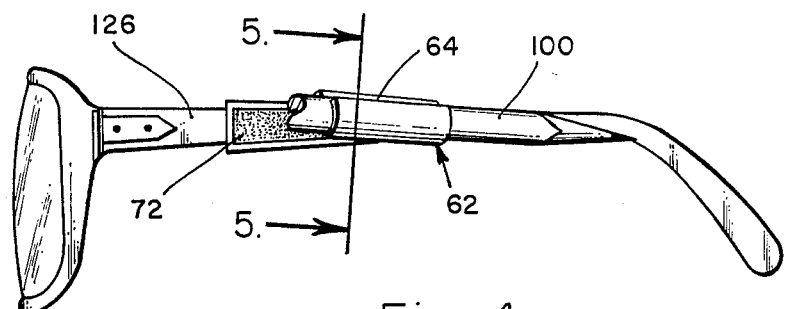
Fig. 4.

APPARATUS FOR RETAINING A WRITING INSTRUMENT ON A PAIR OF SPECTACLES OR SUNGLASSES

BACKGROUND OF THE INVENTION

1. Field of the Invention

The field of the present invention relates to attachments to spectacles or sunglasses which further enhances their usefulness. The present invention also relates to apparatus which are designed to carry writing instruments such as pens and pencils.

2. Description of the Prior Art

In general, writing instruments such as a pen or pencil are carried in the pocket of a garment. When wearing a suit jacket or sports coat, the writing instrument is traditionally carried in an inside pocket. When wearing only a shirt, the writing instrument is carried in a breast pocket of the shirt.

In the construction industry, workers frequently wear polo shirts or T-shirts which do not have any breast pockets. It is frequently necessary for workers to have the use of a writing instrument such as pen or pencil in order to mark measurements on one or more surfaces of a particular item such as a beam, rod, etc. Traditionally, workers carry such pen or pencil behind their ear. While the technique for placing a pen or pencil behind an ear and permitting it to rest between an ear and the user's head or hair has become commonplace, it also creates many problems. The writing instrument is placed in an unstable position. Since the worker is physically active in moving around a construction project, the writing instrument frequently falls off and is lost. While some workers do wear shirts with pockets, placing a writing instrument, especially a lead pencil, in a breast pocket, also creates problems. Since the worker frequently bends over, it is easy for the writing instrument to fall out of the pocket and get lost. In addition, if a worker wears spectacles or sunglasses, the temples of the spectacles or sunglasses take up the place behind the wearer's ear where the writing instrument would be placed. Therefore, there really is no room to place the writing instrument behind the wearer's ear if he or she is also wearing spectacles or sunglasses.

Therefore, a significant need exists for an apparatus which permits a writing instrument to be easily carried by a construction worker such as a carpenter, electrician, plumber, etc. who is physically active and must constantly have a pencil readily available. In addition, there is a need for an apparatus which enables such a construction worker who wears spectacles or sunglasses to easily carry such a writing instrument in a location where it is readily accessible and where it will not accidentally fall off and get lost.

SUMMARY OF THE PRESENT INVENTION

The present invention is an apparatus to be attached to a pair of spectacles or sunglasses and which provides a means for carrying a writing instrument in a manner from which it can be readily removed for use and subsequently replaced on the apparatus for subsequent reuse.

It has been discovered, according to the present invention, that the combination of a partially opened generally cylindrical hollow clip and an attachment means by which the partially opened hollow generally cylindrical clip can be either permanently or removably attached to a pair of spectacles or sunglasses provides an apparatus for removably retaining a writing instrument such as a pen or pencil in a manner from which the writing instrument can be easily removed from the hollow retaining clip for use and subsequently replaced in the hollow retaining clip for subsequent reuse.

It has also been discovered, according to the present invention, that a hollow retaining clip which is generally elongated and generally circular or oval in cross-section, which is open at both ends, and which has a diameter that is slightly larger than the diameter of a conventional lead pencil; when provided with a longitudinal slot which extends along its entire length for a portion of its circumference no wider than just smaller than the diameter of a conventional lead pencil, provides an efficient means for retaining such a lead pencil.

It has further been discovered, according to the present invention, that if the hollow retaining clip is made of flexible material such as thin plastic, the writing instrument such as a pencil can be easily placed through the elongated slot whose width is slightly smaller than the diameter of the pencil and can be retained within the retaining clip whose diameter is slightly larger than the diameter of the lead pencil.

It has also been discovered, according to the present invention, that if the retaining means further comprises an elongated flat bar which is bent to extend from its point of attachment to the hollow retaining clip toward the body of the hollow retaining clip, then the elongated flat bar can be inserted within a sleeve that has been placed on the temples of a pair of glasses to thereby retain the hollow retaining clip thereon. More particularly, if the sleeve or jacket which is slidably placed on the temples of a pair of spectacles or sunglasses is a conventional item known as Croakies, the elongated flat bar can be removably slid between a temple of the spectacles or sunglasses, and a portion of the sleeve or jacket of the Croakies to thereby retain the hollow retaining clip thereon. Preferably, the orientation of the retaining means is such that the longitudinal opening in the surface of the hollow retaining clip upon upwardly when the spectacles or sunglasses are worn.

It has further been discovered, according to the present invention, that if a portion of the exterior surface of the hollow retaining clip comprises one portion of a mating velcro type fastener and a portion of a temple from a pair of spectacles or sunglasses comprises the opposite mating velcro type fastener, then the retaining means can comprise the pair of mating Velcro fasteners.

It is therefore an object of the present invention to provide an apparatus which can be moveable and removably attached to a portion of a pair of spectacles or sunglasses, and preferably the temple portion thereof, and which further provides a means for removably retaining a writing instrument.

It is a further object of the present invention to provide an apparatus which is light weight and flexible so that it will not be cumbersome when attached on a temple of a pair of spectacles or sunglasses.

It is an additional object of the present invention to provide an apparatus which can be attached to a temple of a pair of spectacles or sunglasses and retain a writing instrument therein such that the writing instrument can be carried between an ear and the side of the user's head when the user is wearing the spectacles or sunglasses.

It is also an object of the present invention to provide an apparatus which can be attached adjacent a temple of a pair of spectacles or sunglasses and retain a writing instrument therein such that the writing instrument can be carried between an ear and the side of the user's head when the user is wearing the spectacles or sunglasses.

It is another object of the present invention to provide an apparatus for retaining a writing instrument either on or adjacent a pair of spectacles or sunglasses which apparatus is inexpensive and can be easily replaced if it becomes worn or broken.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 1 is a perspective view of the preferred embodiment of the present invention apparatus for retaining a writing instrument.

FIG. 2 is an end view of the preferred embodiment of the present invention apparatus for retaining a writing instrument.

FIG. 3 is a perspective view of the present invention apparatus for retaining a writing instrument attached adjacent to a pair of spectacles or sunglasses.

FIG. 4 is a side elevational view of an alternative embodiment of the present invention apparatus for retaining a writing instrument attached to a temple of a pair of spectacles or sunglasses.

FIG. 5 is a cross-sectional view taken along line 5-5 of FIG. 4.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many specific embodiments which can represent applications of the principles of the invention. Various changes and modifications obvious to one skilled in the art to which the invention pertains are deemed to be within the spirit, scope and contemplation of the invention as further defined in the appended claims.

Referring particularly to FIG. 1, ther is shown at 10 the preferred embodiment of the present invention apparatus for retaining a writing instrument on a pair of spectacles or sunglasses. The retaining apparatus 10 comprises a writing instrument retaining means 20 and an attachment means 40. The retaining means 20 further comprises an elongated hollow member 22 which is open at its front end 24 and its rear end 26 to thereby define an interior chamber 28 which runs for the entire length of the elongated hollow member 22. In the preferred embodiment, the elongated hollow member 22 is generally cylindrical. The wall 30 of the elongated hollow member 22 further comprises a longitudinal slot 32 which runs the entire length of the wall 30. The longitudinal slot opens into the interior chamber 28 and also intersects the front opening 25 at the front end 24 and the rear opening 27 at the rear end 26. Therefore, the slot 32 provides a means by which a cylindrical object which may be longer than the retaining means 22 may be inserted into the retaining means and protrude through the front opening 25 and or rear opening 27. Referring to FIG. 3, it can be seen that a conventional lead pencil 100 can be inserted through slot 32 since the pencil is placed transversely through slot 32 such that its longitudinal axis corresponds to the longitudinal orientation of the retaining means 20. While the pencil 100 is shown with its eraser end protruding through front opening 25 and its point end protruding through rear ending 27, it will be appreciated that the pencil can be reversed and the tip can protrude through front opening 25 while the eraser protrudes through rear opening 27. The retaining apparatus 10 can be configurated such that its interior chamber diameter D is just slightly larger than the diameter of a conventional pencil such that there is a press snug fit. In this way, the pencil 100 will not fall out. It will also be appreciated that the slot width "W" is preferably smaller than the diameter of the conventional pencil by a small amount. In this way, the pencil will have to be squeezed through the slot 32 to further enhance the tight fit. The retaining means 20 is preferably made of flexible material such as plastic so that the writing instrument 100 can be squeezed through the slot and be press fit into the interior chamber 28. The length "L" of retaining means 20 need only be sufficiently long to provide a balanced fit for the writing instrument 100. By way of example, the length "L" may be from one-half inch to two inches. If the retaining means 20 is designed to hold a conventional pencil, the interior diameter "D" is approximately one-quarter of an inch. The slot width "W" can be approximately three-sixteenths of an inch. It will be appreciated that the retaining means 20 can be designed to retain any type of writing instrument. Accordingly, the diameter "D" and width "W" can be adjusted to accommodate the particular type of writing instrument for which the particular retaining apparatus is intended. For example, a Scripto mechanical lead pencil is fatter than a conventional wooden lead pencil and so the interior diameter "D" should be approximately five-sixteenths of an inch while the slot width "W" can be one-quarter of an inch.

The attachment means 40 by which the retaining means 20 is retained on a pair of spectacles or sunglasses by being attached adjacent a temple or to a temple is illustrated in FIGS. 3 through 5. Referring to FIG. 3, a conventional pair of spectacles or sunglasses is shown at 110. Such optical wear comprises a rim 112 retaining a pair of lenses 114 and 116, a pair of oppositely disposed temples 120 and 126 which terminate in pair of bows respectively, 122 and 128. For the intended purpose of the present invention retaining apparatus 10, it is best that the retaining apparatus be in the proximity of a temple.

In the preferred embodiment as illustrated in FIGS. 1 through 3, the attachment means 40 is comprised of a flat elongated bar 42 which is attached to a portion of the wall 30 of retaining means 20 by cross-bar 44. Elongated bar 42 and cross-bar 44 may be of one piece construction. Preferably, elongated bar is pre-sprung so that it tapers toward the wall 30 as its distance from cross-bar 44 increases, however, an elongated bar which does straight back and does not taper is also within the spirit and scope of the present invention. A small gap 46 exists between the free end of elongated bar 42 and wall 30. In this embodiment, it is necessary to have a tight sleeve fit around a portion of a temple of the spectacles or sunglasses so that the elongated bar may be slid between the sleeve and the temple and retained thereon adjacent the temple. One type of tight sleeve arrangement is provided by a conventional spectacle retaining apparatus commonly known as a Croakie. The Croakie 140 is shown in FIG. 3 and comprises a pair of sleeves 142 and 144 which slidably fit onto temples 120 and 126 respectively and a joining strap 150 which joins the two sleeves. When worn by a user, the strap goes around the back of the user's head. Each sleeve 142 and 144 is made of stretch fabric and can be slid onto each respectively temple so there is a tight press fit between the sleeve and the temple. Anything slid between the sleeve and the temple is retained thereon by the tight press fit. As illustrated in FIG. 3, sleeve 144 from Croakie 140 is slid onto temple 126 and elongated bar 40 is slid between the temple 126 and sleeve portion 144 of Croakie 140. The retaining means 20 extends above the temple 126. It will be appreciated that the present invention writing instrument retaining apparatus 10 can also be designed such that the retaining means 20 is adjacent the outside of temple 126 instead of being above temple 126. It will be appreciated that the retaining apparatus 10 retaining means need not be an entire Croakie 140 but instead can merely be a tight fitting sleeve which fits around a portion of the temple 126. When worn in this manner, the temple 126 with the sleeve thereon rests on an ear and the retaining means 20 sits above the ear between the user's head and/or hair and the ear.

An alternative attachment means is illustrated in FIGS. 4 and 5. In this attaching means 60, one half of a mating Velcro member 70 is attached to a portion of wall 30 and the opposite half of mating Velcro member 72 is attached to a portion of a temple. In the illustration shown in FIG. 5, a sleeve 80 is slid around temple 126 and mating Velcro member 72 is attached to sleeve 80. It is also within the spirit and scope of the present invention for the mating Velcro member 72 to be attached directly to the temple 126. In the illustration shown in FIG. 4, the mating Velcro members 70 and 72 are coupled side by side so that the writing instrument retaining means 62 is off to the side of the temple 126. It will be appreciated that the mating Velcro members 70 and 72 can be located so that their attachment is top to bottom, in the orientation illustrated in FIG. 3.

While it is possible for the slot 32 in the preferred embodiment and slot 64 in the alternative embodiment to be oriented at any location, it is preferred that the orientation be such that the slot is at the top most position of the retaining means when the writing instrument retaining apparatus is worn on the spectacles or sunglasses.

Defined in broad terms, the present invention is an apparatus for retaining a writing instrument on a temple of a pair of spectacles or sunglasses, comprising:
  a. a writing instrument retaining means;
  b. said writing instrument retaining means further comprising:
    (i) an elongated hollow member having a side wall which is open at its front end and its rear end to thereby define an interior chamber which runs for the entire length of the retaining means and is open at both ends,
    (ii) the side wall having a longitudinal slot which runs the entire length of the elongated hollow member and which opens into the interior chamber and intersects the front opening and the rear opening of the elongated hollow member; and
  c. an attachment means connected to said elongated hollow member by which said writing instrument retaining means is retained on a temple of a pair of spectacles or sunglasses.

The attachment means may comprise a flat elongated bar which is attached to a portion of the wall of said elongated hollow member by a cross-bar such that the flat elongated bar extends for at least a portion of the distance adjacent the wall, whereby the temple of said pair of spectacles or sunglasses is fitted with a tight flexible sleeve and the flat elongated bar is inserted between the temple and the tight flexible sleeve. In the preferred embodiment, the elongated bar is pre-sprung so that it tapers toward the wall as its distance from the cross-bar increases.

In an alternative embodiment, the attachment means may comprise a mating Velcro member attached to a portion of the wall of said elongated hollow member for mating engagement with a Velcro member attached to portion of a temple of said pair of spectacles or sunglasses.

In the preferred embodiment, said elongated hollow member is generally cylindrical. Other possible cross-sections for the elongated hollow member beside circular include oval.

For its most common use with a lead pencil, the interior hollow chamber of said elongated hollow member is slightly larger than the diameter of a standard lead pencil. For this embodiment, the width of said slot is slightly smaller than the diameter of a standard lead pencil.

In the preferred embodiment, said elongated hollow member is made of flexible plastic.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. An apparatus for retaining a writing instrument on a temple of a pair of spectacles, comprising:
  a. a writing instrument retaining means;
  b. said writing instrument retaining means further comprising:
    (i) an elongated hollow member having a side wall which is open at its front end and its rear end to thereby define an interior chamber which runs for the entire length of the retaining means and is open at both ends,
    (ii) the side wall having a longitudinal slot which runs the entire length of the elongated hollow member and which opens into the interior chamber and intersects the front opening and the rear opening of the elongated hollow member;
  c. an attachment means connected to said elongated hollow member by which said writing instrument retaining means is retained on a temple of a pair of spectacles; and d. said attachment means comprising a flat elongated bar which is attached to a portion of the side wall of said elongated hollow member by a cross-bar such that the flat elongated bar extends for at least a portion of the distance adjacent the side wall;
e. whereby a temple of said pair of spectacles is fitted with a tight flexible sleeve and the flat elongated bar is inserted between the temple and the tight flexible sleeve.

2. An apparatus for retaining a writing instrument on a temple of a pair of spectacles in accordance with claim 1, wherein said elongated hollow member is generally cylindrical.

3. An apparatus for retaining a writing instrument on a temple of a pair of spectacles in accordance with claim 1 wherein the interior diameter of the interior hollow chamber of said elongated hollow member is slightly larger than the diameter of a standard lead pencil.

4. An apparatus for retaining a writing instrument on a temple of a pair of spectacles in accordance with claim 1 wherein the width of said slot is slightly smaller than the diameter of a standard lead pencil.

5. An apparatus for retaining a writing instrument on a temple of a pair of spectacles in accordance with claim 1 wherein said elongated hollow member is made of flexible plastic.

6. An apparatus for retaining a writing instrument on a temple of a pair of spectacles, comprising:
a. a writing instrument retaining means;
b. said writing instrument retaining means further comprising:
  (i) an elongated hollow member having a side wall which is open at its front end and its rear end to thereby define an interior chamber which runs for the entire length of the retaining means and is open at both ends,
  (ii) the side wall having a longitudinal slot which runs the entire length of the elongated hollow member and which opens into the interior chamber and intersects the front opening and the rear opening of the elongated hollow member;
c. an attachment means connected to said elongated hollow member by which said writing instrument retaining means is retained on a temple of a pair of spectacles;
d. said attachment means comprising a flat elongated bar which is attached to a portion of the side wall of said elongated hollow member by a cross-bar such that the flat elongated bar extends for at least a portion of the distance adjacent the side wall; and
e. said flat elongated bar is pre-sprung so that it tapers toward the side wall as its distance from the cross-bar increases;
f. whereby a temple of said pair of spectacles is fitted with a tight flexible sleeve and the flat elongated bar is inserted between the temple and the tight flexible sleeve.

7. An apparatus for retaining a writing instrument on a temple of a pair of spectacles in accordance with claim 6, wherein said elongated hollow member is generally cylindrical.

8. An apparatus for retaining a writing instrument on a temple of a pair of spectacles in accordance with claim 6 wherein the interior diameter of the interior hollow chamber of said elongated hollow member is slightly larger than the diameter of a standard lead pencil.

9. An apparatus for retaining a writing instrument on a temple of a pair of spectacles in accordance with claim 6 wherein the width of said slot is slightly smaller than the diameter of a standard lead pencil.

10. An apparatus for retaining a writing instrument on a temple of a pair of spectacles in accordance with claim 6 wherein said elongated hollow member is made of flexible plastic.

11. An apparatus for retaining a writing instrument on a temple of a pair of sunglasses, comprising:
a. a writing instrument retaining means;
b. said writing instrument retaining means further comprising:
  (i) an elongated hollow member having a side wall which is open at its front end and its rear end to thereby define an interior chamber which runs for the entire length of the retaining means and is open at both ends.
  (ii) the side wall having a longitudinal slot which runs the entire length of the elongated hollow member and which opens into the interior chamber and intersects the front opening and the rear opening of the elongated hollow member;
c. an attachment means connected to said elongated hollow member by which said writing instrument retaining means is retained on a temple of a pair of sunglasses; and
d. said attachment means comprising a flat elongated bar which is attached to a portion of the side wall of said elongated hollow member by a cross-bar such that the flat elongated bar extends for at least a portion of the distance adjacent the side wall;
e. whereby a temple of said pair of sunglasses is fitted with a tight flexible sleeve and the flat elongated bar is inserted between the temple and the tight flexible sleeve.

12. An apparatus for retaining a writing instrument on a temple of a pair of sunglasses in accordance with claim 11, wherein said elongated hollow member is generally cylindrical.

13. An apparatus for retaining a writing instsrument on a temple of a pair of sunglasses in accordance with claim 11 wherein the interior diameter of the interior hollow chamber of said elongated hollow member is slightly larger than the diameter of a standard lead pencil.

14. An apparatus for retaining a writing instrument on a temple of a pair of sunglasses in accordance with claim 11 wherein the width of said slot is slightly smaller than the diameter of a standard lead pencil.

15. An apparatus for retaining a writing instrument on a temple of a pair of sunglasses in accordance with claim 11 wherein said elongated hollow member is made of flexible plastic.

16. An apparatus for retaining a writing instrument on a temple of a pair of sunglasses, comprising:
a. a writing instrument retaining means;
b. said writing instrument retaining means further comprising:
  (i) an elongated hollow member having a side wall which is open at its front end and its rear end to thereby define an interior chamber which runs for the entire length of the retaining means and is open at both ends,
  (ii) the side wall having a longitudinal slot which runs the entire length of the elongated hollow member and which opens into the interior chamber and intersects the front opening and the rear opening of the elongated hollow member;

c. an attachment means connected to said elongated hollow member by which said writing instrument retaining means is retained on a temple of a pair of sunglasses;

d. said attachment means comprising a flat elongated bar which is attached to a portion of the side wall of said elongated hollow member by a cross-bar such that the flat elongated bar extends for at least a portion of the distance adjacent the side wall; and e. said flat elongated bar is pre-sprung so that it tapers toward the side wall as its distance from the cross-bar increases;

f. whereby a temple of said pair of sunglasses is fitted with a tight flexible sleeve and the flat elongated bar is inserted between the temple and the tight flexible sleeve.

17. An apparatus for retaining a writing instrument on a temple of a pair of sunglasses in accordance with claim 16, wherein said elongated hollow member is generally cylindrical.

18. An apparatus for retaining a writing instrument on a temple of a pair of sunglasses in accordance with claim 16 wherein the interior diameter of the interior hollow chamber of said elongated hollow member is slightly larger than the diameter of a standard lead pencil.

19. An apparatus for retaining a writing instrument on a temple of a pair of spectacles in accordance with claim 16 wherein the width of said slot is slightly smaller than the diameter of a standard lead pencil.

20. An apparatus for retaining a writing instrument on a temple of a pair of sunglasses in accordance wtih claim 16 wherein said elongated hollow member is made of flexible plastic.

* * * * *